United States Patent
Lee et al.

(10) Patent No.: US 10,145,934 B2
(45) Date of Patent: Dec. 4, 2018

(54) TERMINAL AND METHOD FOR MEASURING LOCATION THEREOF

(71) Applicant: SAMSUNG ELECTRONICS CO., LTD., Suwon-si, Gyeonggi-do (KR)

(72) Inventors: Yonggwon Lee, Anyang-si (KR); Youngkyu Kim, Hwaseong-si (KR); Taewon Ahn, Suwon-si (KR); Dongkeon Kong, Suwon-si (KR); Kyungjae Kim, Suwon-si (KR); Junhyung Kim, Yongin-si (KR); Dusan Baek, Seoul (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/263,709

(22) Filed: Sep. 13, 2016

(65) Prior Publication Data

US 2017/0074965 A1   Mar. 16, 2017

(30) Foreign Application Priority Data

Sep. 14, 2015  (KR) .................. 10-2015-0129982
Feb. 1, 2016   (KR) .................. 10-2016-0012512

(51) Int. Cl.
*H04W 24/00*   (2009.01)
*G01S 5/02*   (2010.01)
(Continued)

(52) U.S. Cl.
CPC .......... *G01S 5/0252* (2013.01); *G01C 21/206* (2013.01); *G01S 5/0263* (2013.01);
(Continued)

(58) Field of Classification Search
None
See application file for complete search history.

(56) References Cited

U.S. PATENT DOCUMENTS

| | | | |
|---|---|---|---|
| 8,457,656 B2 | 6/2013 | Perkins et al. |
| 8,996,037 B2 | 3/2015 | Chen et al. |
| (Continued) | | | |

FOREIGN PATENT DOCUMENTS

| | | |
|---|---|---|
| WO | 2007/129939 | 11/2007 |
| WO | 2015/031979 | 3/2015 |

OTHER PUBLICATIONS

Search Report dated Dec. 20, 2016 in counterpart International Patent Application No. PCT/KR2016/010360.
(Continued)

*Primary Examiner* — Moustapha Diaby
(74) *Attorney, Agent, or Firm* — Nixon & Vanderhye, P.C.

(57) ABSTRACT

A user terminal measures a location thereof. In a method for measuring a terminal location, the terminal measures received signal strength indicator (RSSI) values of signals received from a plurality of electronic devices deployed in a space. Then the terminal extracts a preliminary location of the terminal with respect to each of a plurality of predetermined algorithms by applying the plurality of algorithms to the measured RSSI values, identifies a first estimated location of the terminal by applying a predetermined weight to each preliminary location, identifies a second estimated location of the terminal using an output of at least one sensor, and determines a final location of the terminal, based on the first and second estimated locations.

18 Claims, 19 Drawing Sheets

(51) Int. Cl.
*H04W 64/00* (2009.01)
*H04W 4/02* (2018.01)
*G01C 21/20* (2006.01)
*G01S 5/14* (2006.01)

(52) U.S. Cl.
CPC .............. *G01S 5/0268* (2013.01); *G01S 5/14* (2013.01); *H04W 4/02* (2013.01); *H04W 4/023* (2013.01); *H04W 64/00* (2013.01)

(56) References Cited

U.S. PATENT DOCUMENTS

| | | | |
|---|---|---|---|
| 9,002,372 | B2 | 4/2015 | Shakespeare et al. |
| 2004/0203904 | A1* | 10/2004 | Gwon ................... G01S 5/0252 455/456.1 |
| 2006/0052115 | A1 | 3/2006 | Khushu |
| 2006/0220954 | A1* | 10/2006 | Hunt ........................ G01S 19/48 342/357.31 |
| 2007/0168127 | A1 | 7/2007 | Zaruba et al. |
| 2008/0261622 | A1 | 10/2008 | Lee et al. |
| 2010/0248668 | A1* | 9/2010 | Katayama ............. G01S 5/0221 455/226.1 |
| 2011/0065450 | A1* | 3/2011 | Kazmi .................. G01S 5/0252 455/456.1 |
| 2012/0309408 | A1* | 12/2012 | Marti .................... G01S 5/0027 455/456.1 |
| 2013/0201003 | A1 | 8/2013 | Sabesan et al. |
| 2014/0003365 | A1 | 1/2014 | Carey et al. |
| 2014/0206381 | A1* | 7/2014 | Yamada .................... G01S 5/14 455/456.1 |
| 2014/0211691 | A1* | 7/2014 | Emadzadeh .......... H04W 64/00 370/328 |
| 2014/0334463 | A1 | 11/2014 | Lipman et al. |
| 2015/0094094 | A1 | 4/2015 | Rochberger et al. |
| 2015/0097731 | A1 | 4/2015 | Russell |
| 2015/0119076 | A1 | 4/2015 | Cohen |
| 2016/0216360 | A1 | 7/2016 | Georgy et al. |

OTHER PUBLICATIONS

Extended Search Report dated Sep. 21, 2018 in counterpart European Patent Application No. 16846888.2.

Rodionov Denis et al: "A hybrid localization technique for patient tracking", Engineering in Medicine and Biology Society (EMBC), 2013 35th Annual International Conference of the IEEE, IEEE, Jul. 3, 2013 (Jul. 3, 2013), pp. 6728-6731, XP032486070.

* cited by examiner

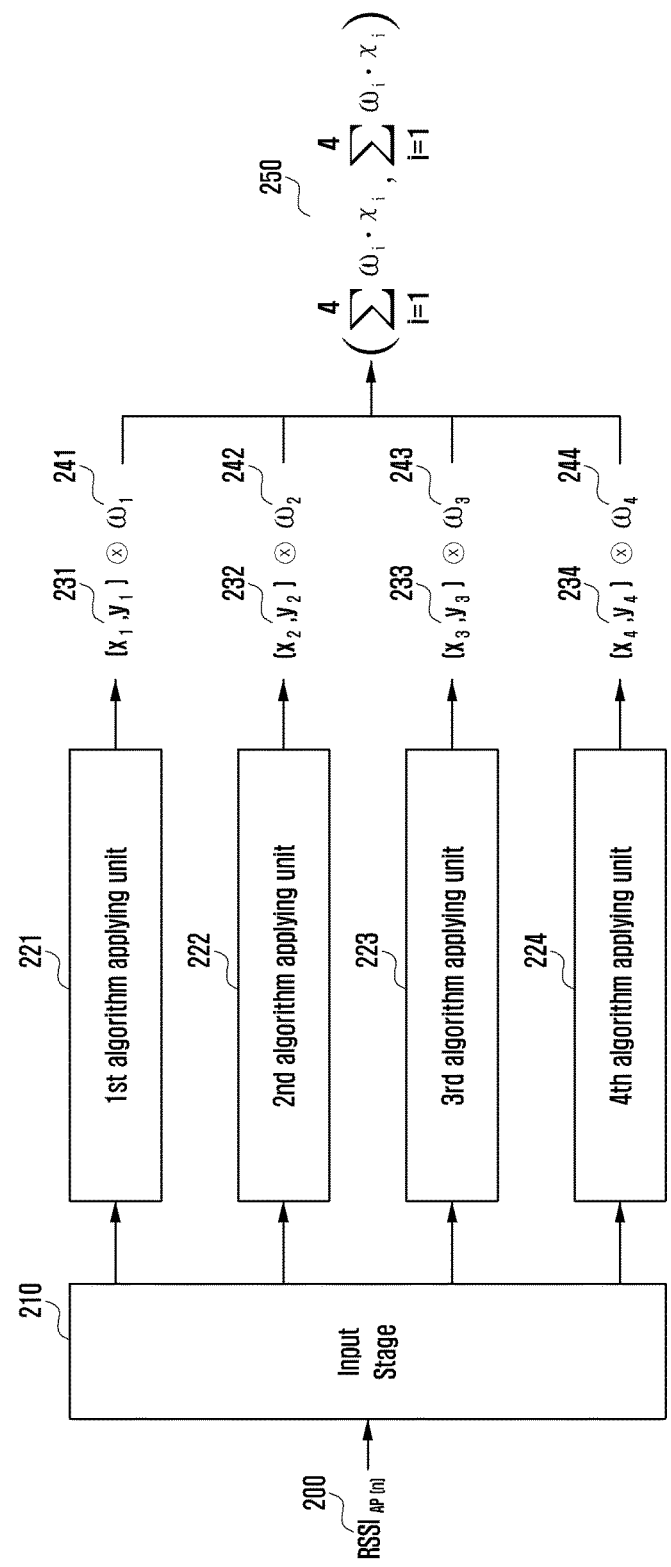

FIG. 3C

| | n = 1 | n = 2 | n = 3 | n = 4 | Accumulated Score | Weight |
|---|---|---|---|---|---|---|
| 1st Algorithm | ↑ | ↑ | ↑ | ↑ | 4 | 0.30 |
| 2nd Algorithm | ↑ | ↑ | ↑ | ↑ | 4 | 0.30 |
| 3rd Algorithm | ↑ | ↓ | ↑ | ↑ | 3 | 0.25 |
| 4th Algorithm | ↑ | ↓ | ↓ | ↑ | 2 | 0.15 |

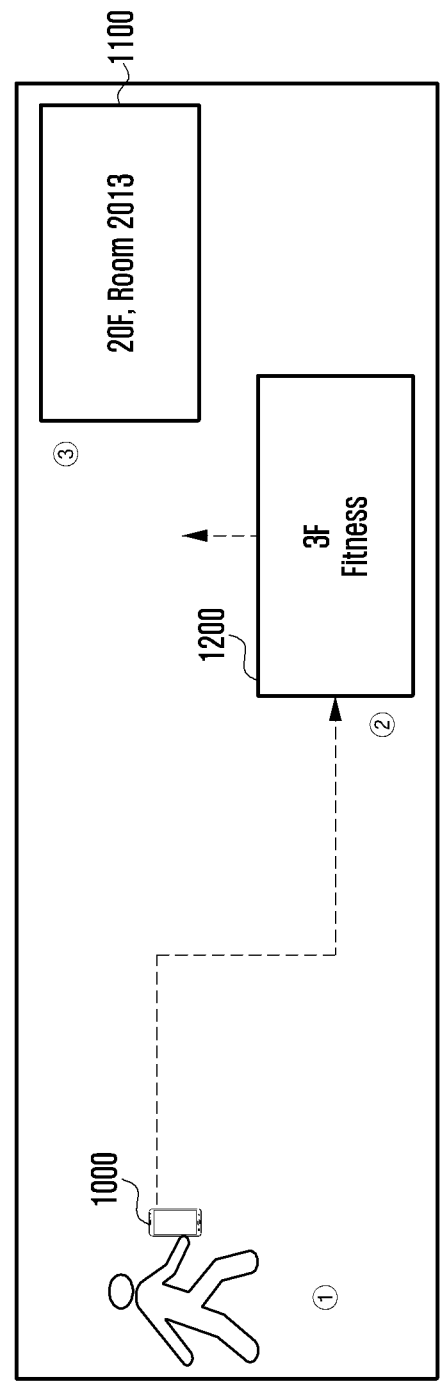

FIG. 11A
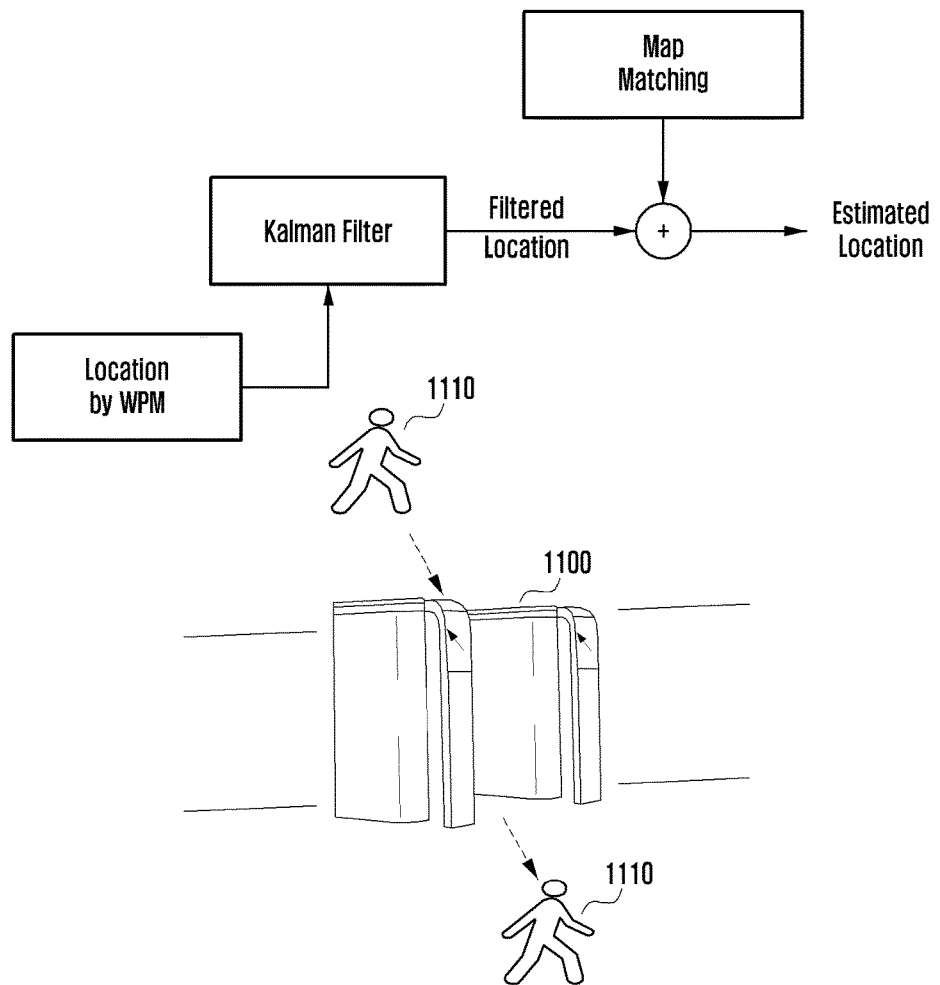
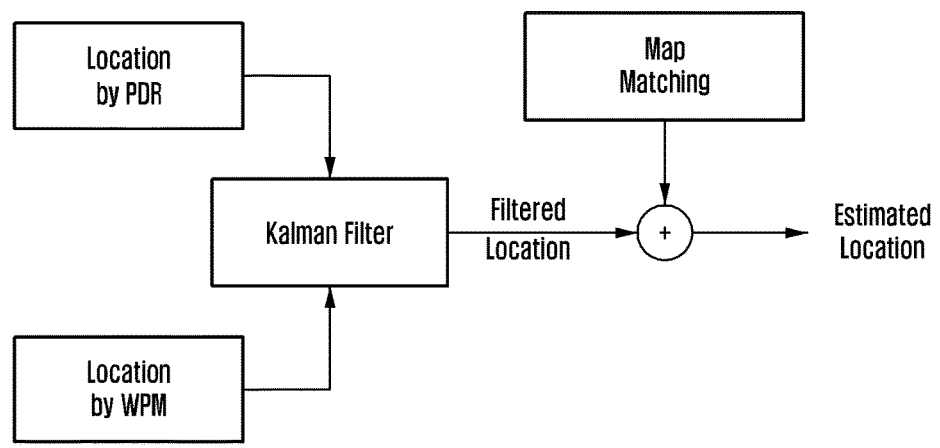

TERMINAL AND METHOD FOR MEASURING LOCATION THEREOF

CROSS-REFERENCE TO RELATED APPLICATIONS

This application is based on and claims priority under 35 U.S.C. 119 to Korean Patent Application No. 10-2015-0129982, which was filed in the Korean Intellectual Property Office on Sep. 14, 2015 and Korean Patent Application No. 10-2016-0012512, which was filed in the Korean Intellectual Property Office on Feb. 1, 2016, the contents of each of which are incorporated by reference herein in their entireties.

TECHNICAL FIELD

The disclosure relates generally to a terminal and a method for measuring a location of the terminal. For example, the disclosure relates to a method for measuring a location of a terminal more precisely by applying a weight to a preliminary location of the terminal determined using a received signal strength indicator (RSSI) and then by performing compensation.

BACKGROUND

Internet has recently evolved from a traditional human-centric network, which allows users to create and consume information, into an internet of things (IoT) network which allows distributed things to exchange and process information. Further, such IoT technology is now growing into an internet of everything (IoE) technology through a combination of big data processing technology based on a connection with a cloud server or the like. In order to realize IoT or IoE, various related technologies such as sensing technique, infrastructure for wired/wireless communication and network, service interface technique, and security technique are also required. In addition, sensor network technology, machine-to-machine (M2M) technology, machine type communication (MTC) technology, etc. are studied in these days.

In IoT environments, intelligent internet technology services for collecting and analyzing various kinds of data from connected things and then creating a new value to the human life may be provided. Moreover, through convergence and integration between the existing information technology (IT) and several industries, IoT technology may be applied to a great variety of industrial fields such as a smart home, a smart building, a smart city, a smart car or a connected car, a smart grid, a healthcare, smart home appliances, and a high-tech medical service.

Meanwhile, the implementation of IoT technology inherently needs techniques to measure a user location and provide a service on the basis of the user location.

However, typical user proximity sensing techniques based on Bluetooth low energy (BLE) technique requires essentially a BLE device and thus has a drawback of higher initial cost. In addition, although being advantageous to the detection of a user's proximity, the user proximity sensing technique has a relatively low accuracy in measuring a user's location.

Another technique to estimate a terminal's location by measuring a received signal strength indicator (RSSI) of a Wi-Fi signal received from a wireless access point (AP) has an advantage of requiring no additional device such as a BLE device. However, RSSI-based location estimation has a strong possibility of causing errors due to irregular accuracy depending on terminal locations.

Accordingly, a technique to precisely measure a user location and reliably provide a service on the basis of the user location is needed.

SUMMARY

The disclosure provides a method for obtaining a user location more precisely by, for example, applying a weight to a preliminary location measured by means of various techniques and then by performing compensation.

According to an example embodiment of this disclosure, a method for measuring a location of a user terminal may include steps of: measuring received signal strength indicator (RSSI) values of signals received from a plurality of electronic devices deployed in a specific space; extracting a preliminary location of the terminal with respect to each of a plurality of predetermined algorithms by applying the plurality of algorithms to the measured RSSI values; identifying a first estimated location of the terminal by applying a predetermined weight to each preliminary location; identifying a second estimated location of the terminal using at least one sensor; and determining a final location of the terminal, based on the first and second estimated locations.

According to another example embodiment of this disclosure, a user terminal may include: a transceiver; and a controller configured to measure received signal strength indicator (RSSI) values of signals received through the transceiver from a plurality of electronic devices deployed in a specific space, to extract a preliminary location of the terminal with respect to each of a plurality of predetermined algorithms by applying the plurality of algorithms to the measured RSSI values, to identify a first estimated location of the terminal by applying a predetermined weight to each preliminary location, to identify a second estimated location of the terminal using at least one sensor, and to determine a final location of the terminal, based on the first and second estimated locations.

BRIEF DESCRIPTION OF THE DRAWINGS

The above and other aspects of the disclosure will become more readily apparent from the following detailed description, taken in conjunction with the accompanying drawings, in which like reference numerals refer to like elements, and wherein:

FIG. 2 is a diagram illustrating an example method for estimating a terminal location using a received signal strength indicator (RSSI) according to an example embodiment.

FIGS. 3A, 3B and 3C are diagrams illustrating an example method for determining a weight applied to each algorithm according to an example embodiment.

FIG. 10 is a diagram illustrating an example method for controlling a PDR function according to an example embodiment.

FIGS. 11A and 11B are diagrams illustrating an example method for controlling a PDR function depending on a user's entrance or exit according to an example embodiment.

DETAILED DESCRIPTION

Figure 1:
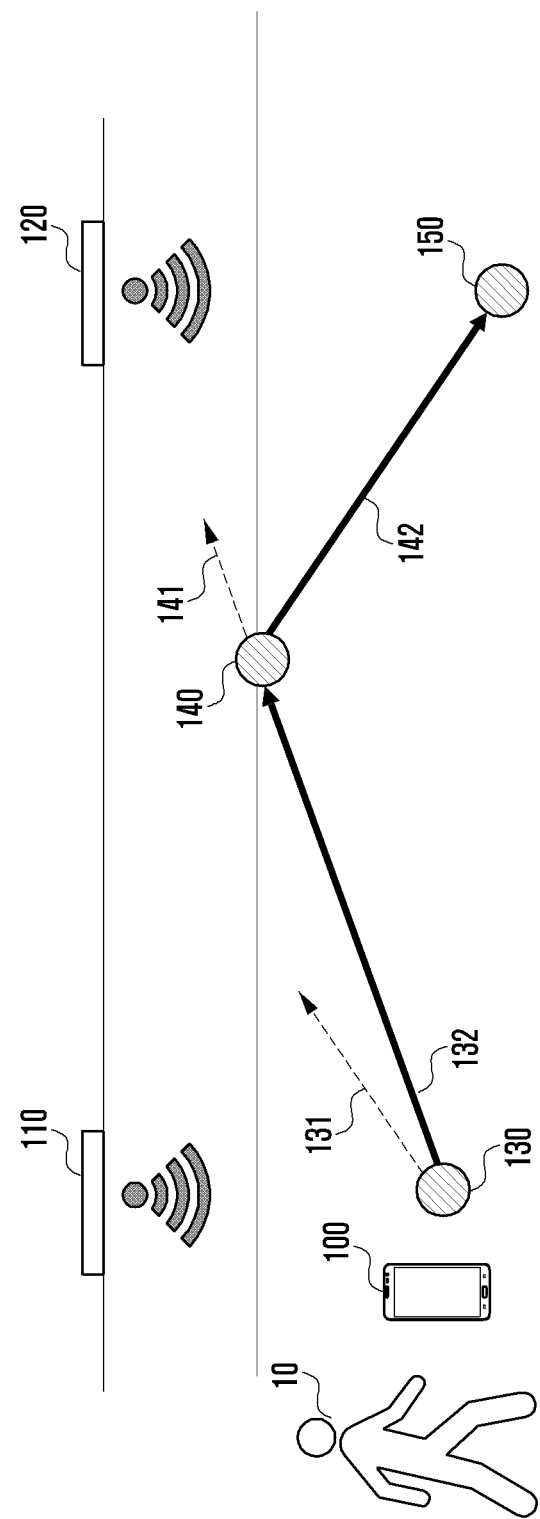
FIG. 1 is a diagram illustrating an example method for measuring a user location by using a terminal carried by a user according to an example embodiment.

Hereinafter, example embodiments of the disclosure will be described with reference to the accompanying drawings. In the following, technical contents well known in the art and having no direct relation to this disclosure may not be described or illustrated in detail to avoid obscuring the subject matter of the disclosure. Through the drawings, some elements may be exaggerated, omitted or schematically depicted. The same or similar reference numerals denote corresponding features consistently.

Advantages and features of this disclosure and methods for achieving them will become apparent from the following description with reference to the following example embodiments together with drawings. The present disclosure is, however, not limited to the example embodiments set forth herein and may be embodied in many different forms. Rather, the disclosed embodiments are provided so that this disclosure will be thorough and complete, and will convey the scope of this disclosure to those skilled in the art as defined by the appended claims.

The expression "1", "2", "first", or "second" used in various embodiments of this disclosure may modify various elements of such embodiments but does not limit the corresponding elements. The above expressions do not limit the sequence and/or importance of the elements but may be used for distinguishing one element from other elements. For example, a first device and a second device indicate different devices although both of them are devices.

The terms used in describing various example embodiments of this disclosure are only examples for describing a given embodiment but do not limit such embodiments. Singular forms are intended to include plural forms unless the context clearly indicates otherwise. Unless defined differently, all terms used herein, which include technical terminologies or scientific terminologies, have the same meaning as that understood by a person skilled in the art to which the present disclosure belongs. The terms "include", "comprise", and "have" as well as derivatives thereof, mean inclusion without limitation.

In addition, the term "module" or "unit" used herein may refer to an element for performing at least one function, operation, or task and may be implemented by software and/or hardware (e.g., processing circuitry, such as, for example, and without limitation a CPU). A plurality of modules or units may be configured to reside on an addressable storage medium and configured to execute on one or more processors (e.g., processing circuitry).

FIG. 1 is a diagram illustrating an example method for measuring a user location using a terminal 100 carried by a user 10 according to an example embodiment.

As illustrated in FIG. 1, in order to measure the location of the user 10, a plurality of electronic devices 110 and 120 may be used in a space where the user 10 and the terminal 100 carried by the user 10 are present.

The electronic devices 110 and 120 may be installed separately at regular intervals in the above space. The electronic devices 110 and 120 may transmit or receive a signal to or from the terminal 100. Thus, the terminal 100 may measure the strength of a signal received from each of the electronic devices 110 and 120 and then measure a distance from each of the electronic devices 110 and 120.

For example, each of the electronic devices 110 and 120 may be a device, such as, for example, and without limitation, an access point (AP), which performs a relay function so as to extend a wired network to a wireless network in the above space.

According to an example embodiment of the disclosure, the terminal 100 may receive a wireless signal from each of the electronic devices 110 and 120 while moving from the first location 130 to a third location 150. Although FIG. 1 illustrates, for example, two electronic devices 110 and 120, three or more electronic devices may reside in the space.

The terminal 100 may measure or determine the location thereof from the wireless signal received from each electronic device. Also, the location of the terminal 100 may be compensated such that its accuracy can be enhanced.

For example, when a moving direction of the terminal 100 is determined preliminarily as indicated by a reference numeral 131, the terminal 100 may perform compensation and thereby determine again the moving direction as indicated by a reference numeral 132. Additionally, when the terminal 100 arrives at a second location 140 and when the moving direction thereof is determined preliminarily as indicated by a reference numeral 141, this direction 141 is not feasible for a user's movement since the second location 140 is on the wall in a real space. Therefore, the terminal 100 may perform compensation and thereby determine again the moving direction as indicated by a reference numeral 142.

Further, if there is a destination of the terminal 100, such as a door, at the right of the third direction 150, the terminal 100 may determine whether the terminal 100 approaches the door within a critical distance.

According to another example embodiment of the disclosure, the terminal 100 may determine the location thereof not only by measuring the strength of signals received from the electronic devices 110 and 120, but also using a plurality of sensors equipped, for example, in the terminal 100.

The final location of the terminal 100 may also be determined, based on both a preliminary terminal location determined using the strength of signals received from the electronic devices 110 and 120 and another preliminary terminal location determined using the sensors.

What the terminal 100 determines as the location thereof and then performs a particular operation based on the determined terminal location is merely an example. Alternatively or additionally, any external device such as a control device or a server present in a space may determine the location of the terminal 100 and then transmit the determined terminal location to the terminal 100 or perform a particular operation corresponding to the determined location.

WiFi signal strength and sensor values measured in the electronic device 100 may, for example, be stored in the following format.

| [WiFi information collection] | | |
|---|---|---|
| Timestamp | SSID | RSSI |
| 0384842834 | f4:d9:fb:95:91:00 | −60 |
| 1775736043 | f4:d9:fb:95:93:c0 | −58 |
| . | . | . |
| . | . | . |
| . | . | . |

| [RDR (Acceleration sensing)] | | | |
|---|---|---|---|
| Timestamp | X | Y | Z |
| 5503240253 | −0.830 | 3.484 | 6.402 |
| 5507659294 | −0.767 | 3.584 | 6.536 |
| . | . | . | . |
| . | . | . | . |
| . | . | . | . |

The estimated user location may be delivered to the server in, for example, the following message format.

```
User_location
{
    "deviceId":""b827ebe235c3",
    "x":10.0,
    "y":12.0
}
```

Based on the above-discussed method, it is possible to more precisely determine the location of the terminal without any additional device or equipment in the space where the terminal is present.

Hereinafter, a method for determining the location of the terminal will be described in greater detail with reference to the drawings.

FIG. 2 is a diagram illustrating an example method for estimating a terminal location using a received signal strength indicator (RSSI) according to an example embodiment. It is assumed, for convenience of description, that the terminal is carried by a user and is located in a certain space. It is also assumed, for convenience of description, that two or more electronic devices (e.g., APs) have been already installed in that space.

Using the RSSI is merely an example, and any other indicator may be used alternatively or additionally to measure the strength of a signal between the terminal and each electronic device.

The terminal may measure the RSSI of signals received from the plurality of electronic devices.

For example, the terminal may measure the RSSI of signals received from APs. Equation 1 given below illustrates a path loss model that indicates a radio wave loss in a free space.

$$RSSI = A - 10n \log(d) \qquad \text{<Equation 1>}$$

In Equation 1, "A" denotes a parameter determined depending on each AP, and "n" may be a parameter determined depending on a layout of a space in which the terminal exists.

The terminal may determine a distance from each AP (namely, a distance between the terminal and each AP) using the above Equation 1 and Equation 2 below and also using the measured RSSI.

$$d = \sqrt{(x_m - x_{AP})^2 + (y_m - y_{AP})^2} \qquad \text{<Equation 2>}$$

In Equations 1 and 2, "d" denotes a distance between the terminal and the AP. In Equation 2, "$X_m$" and "$Y_m$" denote the location of the terminal, and "$X_{AP}$" and "$Y_{AP}$" denote the location of the AP.

Assume, for convenience of description, that the terminal measures n RSSI values 200 from signals received from n APs (In this disclosure, "n" denotes an indefinite number). The n RSSI values 200 may be input to an input stage 210 such that a plurality of predetermined algorithms can be applied to the n RSSI values.

FIG. 2 illustrates four algorithms as the plurality of predetermined algorithms, but the disclosure is not limited thereto. The n RSSI values 200 may be input to the first, second, third and fourth algorithm applying units 221, 222, 223 and 224. An algorithm applying unit may include, for example, and without limitation, processing circuitry operating under the control of various instructions.

Through the first to fourth algorithm applying units 221 to 224, the terminal may identify preliminary locations 231 to 234 determined using the respective algorithms.

Examples of the first to fourth algorithms may, for example, be as follows. At the outset, the first algorithm determines a terminal location using the above-discussed Equations 1 and 2 about a path loss model and a distance determination between the terminal and each AP with regard to three or more APs. For example, the first algorithm may be based on or similar to triangulation.

The second algorithm may, for example, be a procedure for applying a weight to the first algorithm according to the RSSI. For example, the second algorithm may assign a higher reliability to an AP that transmits a higher-strength signal.

On the assumption that the terminal may be located at various places in a space, the third algorithm may, for example, use a result of estimating mathematically the RSSI between each place and each AP using the above-discussed Equations 1 and 2 about a path loss model and a distance determination between a certain place and each AP.

According to the third algorithm, the terminal may, for example, compare an estimated RSSI value of each place with the RSSI value measured from each AP. The terminal may regard, as a terminal location, a specific place at which, for example, the Euclidean error between the estimated RSSI value and the measured RSSI value is minimized.

The fourth algorithm may, for example, determine each distance (d) using the above-discussed Equations 1 and 2 about a path loss model and a distance determination between the terminal and each of four or more APs, and may then determine the terminal location from four or more equations about ratios of the determined distances.

The above-discussed first to fourth algorithms are merely examples, and various algorithms for determining the RSSI and distance between the AP and the terminal may be used. The terminal may identify a plurality of locations of the terminal through the respective algorithms from the n RSSI values 200. For example, as illustrated in FIG. 2, preliminary locations may be determined as $(x_1, y_1)$ 231, $(x_2, y_2)$ 232, $(x_3, y_3)$ 233, and $(x_4, y_4)$ 234.

The terminal may identify the first estimated location 250 by applying predetermined weights 241 to 244 to the respective preliminary locations 231 to 234.

By receiving signals from the APs at predetermined time intervals, measuring the RSSI values, applying the above algorithms to the measured RSSI values, and identifying error rates caused by output values of the applied algorithms and actual values of the terminal location, the weights may be determined based on the error rates.

A process from a step of measuring and/or determining the RSSI values from the n APs to a step of determining the weights may be repeated several times to obtain an average RSSI value and finally converge on a stable weight value.

For example, the weights 241 to 244 may be predetermined values with regard to the respective algorithms. If there are four or more algorithms, the number of the weights may be also four or more.

The terminal may apply respectively the predetermined weights to the preliminary locations 231 to 234. For example, the terminal may apply the weight for the first algorithm to the first preliminary location $(x_1, y_1)$ 231. Similarly, the terminal may apply the weight for the second algorithm to the second preliminary location $(x_2, y_2)$ 232, apply the weight for the third algorithm to the third preliminary location $(x_3, y_3)$ 233, and apply the weight for the fourth algorithm to the fourth preliminary location $(x_4, y_4)$ 234.

The weights 241 to 244 may be smaller than 1, and the sum of the weights for the respective algorithms may be 1. Also, the weights may be determined in advance before performing an operation of determining the terminal location. A method for determining the weights will be described in greater detail below.

The terminal may identify the first estimated location 250 by adding, for each coordinate type, values obtained by respectively applying the predetermined weights 241 to 244 to the determined preliminary locations 231 to 234. For example, the terminal may determine the x-coordinate value of the first estimated location 250 by adding a value in which the predetermined weight 241 is applied to the x-coordinate of the first preliminary location 231, a value in which the predetermined weight 242 is applied to the x-coordinate of the second preliminary location 232, a value in which the predetermined weight 243 is applied to the x-coordinate of the third preliminary location 233, and a value in which the predetermined weight 244 is applied to the x-coordinate of the fourth preliminary location 244. Similarly, the terminal may determine the y-coordinate value of the first estimated location 250 by adding a value in which the predetermined weight 241 is applied to the y-coordinate of the first preliminary location 231, a value in which the predetermined weight 242 is applied to the y-coordinate of the second preliminary location 232, a value in which the predetermined weight 243 is applied to the y-coordinate of the third preliminary location 233, and a value in which the predetermined weight 244 is applied to the y-coordinate of the fourth preliminary location 244.

The first estimated location 250 may be used for determining the final location of the terminal.

Figure 3A:
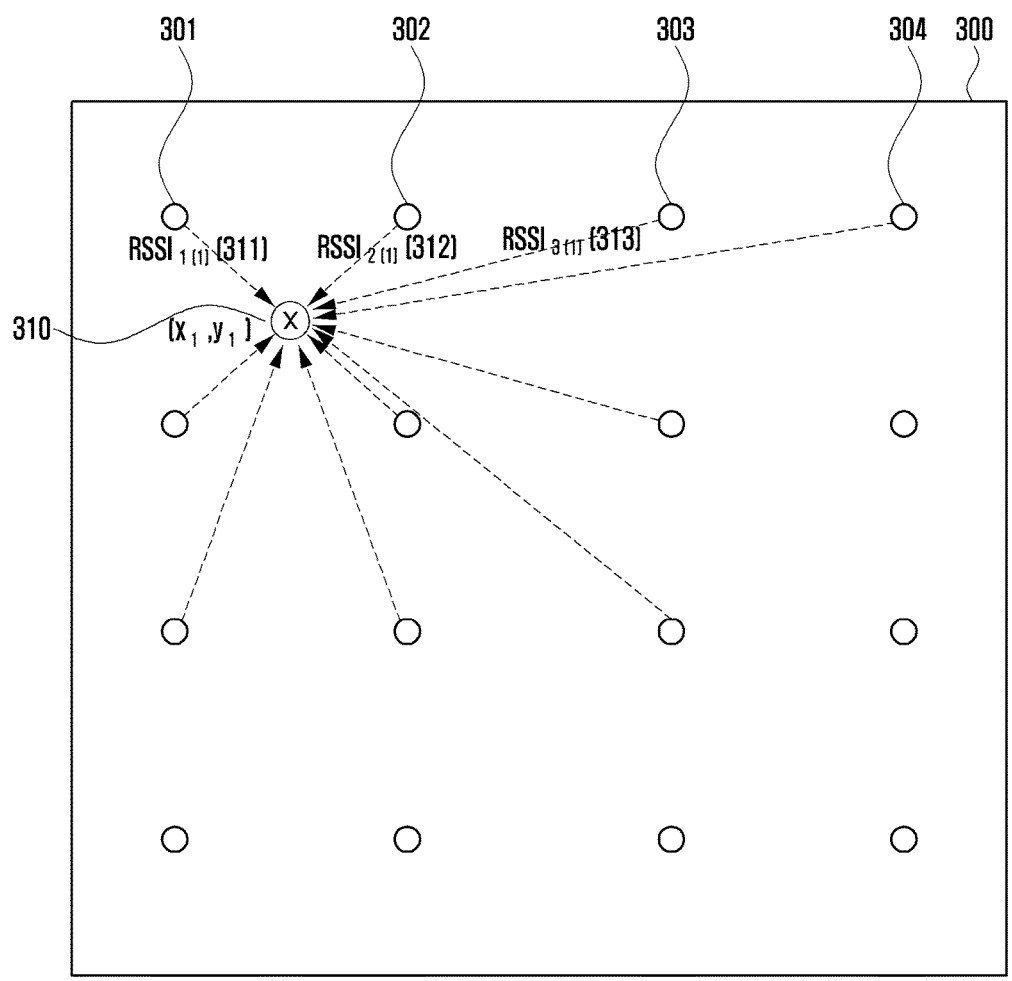
Figure 3B:
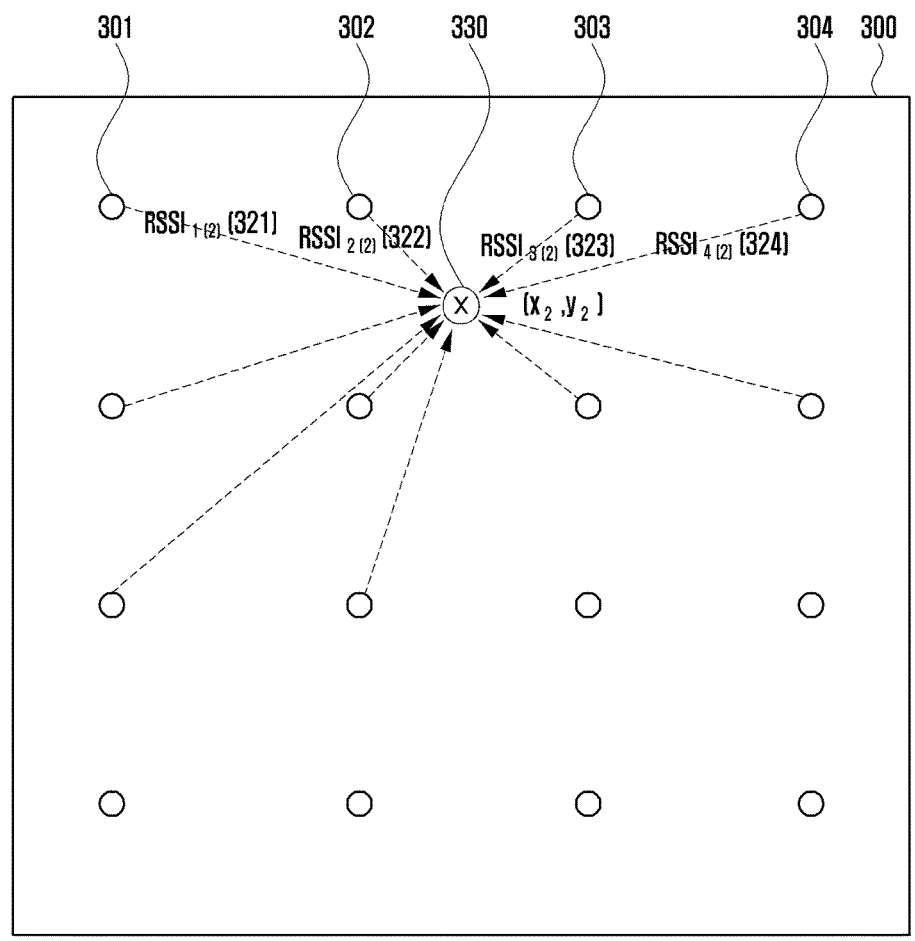

Referring to FIGS. 3A to 3C, an example method for determining the weights 241 to 244 is as follows.

Assume, for convenience of description, that the terminal is present in a certain space 300. As illustrated in FIG. 3A, a plurality of electronic devices 301, 302, 303, 304, and the like may exist in this space 300. Although FIGS. 3A and 3B illustrate sixteen electronic devices residing in the space 300, this is an example only and not to be construed as a limitation.

In order to determine a weight, the terminal may receive signals from the electronic devices 301, 302, 303, 304, and the like at the first location 310. Then the terminal may measure the strength of a signal received from each electronic device at the first location 310. For example, the terminal may measure the first RSSI values 311, 312, 313, and the like of signals received from the respective electronic devices.

Then the terminal may apply plurality of predetermined algorithms to the first RSSI values 311, 312, 313, and the like. Based on each algorithm, the terminal may obtain a terminal location. For example, in case of four algorithms, the terminal may determine four locations of the terminal on the basis of the RSSI values 311, 312, 313, and the like using the four algorithms. In this example, such terminal locations may be different from each other, depending on such algorithms.

After the terminal location is determined using the plurality of algorithms, the terminal may receive signals from the electronic devices 301, 302, 303, 304, and the like at the second location 320 as illustrated in FIG. 3B. Then the terminal may measure the second RSSI values 321, 322, 323, 324, and the like of signals received from the respective electronic devices 301, 302, 303, 304, and the like.

Then the terminal may also apply the predetermined algorithms to the second RSSI values 321, 322, 323, 324, and the like. Based on the respective algorithms, the terminal may obtain a plurality of locations of the terminal.

In order to determine a weight, the terminal knows the location thereof while receiving signals from the electronic devices 301, 302, 303, 304, and the like at each location and then obtaining a terminal location through the above-discussed method. Therefore, the terminal may determine whether the known location thereof is identical with the terminal location obtained using the received signals.

Assume, for convenience of description, that the terminal starts from the first location 310 in FIG. 3A, passes through the second location 320 in FIG. 3B, and then moves rightward in the space 300. While the above-discussed operation is performed to determine a weight, the terminal may know its own location and a moving path.

FIG. 3C illustrates an example of a table that indicates moving directions of the terminal obtained using four algorithms as discussed above.

As illustrated in FIG. 3C, all moving directions of the terminal obtained through the first and second algorithms indicate the rightward direction which is the same as the actual moving direction of the terminal.

However, the second moving direction of the terminal obtained through the third algorithm indicates the leftward direction which is different from the actual moving direction of the terminal.

The second and third moving directions of the terminal obtained through the fourth algorithm indicate the leftward direction which is different from the actual moving direction of the terminal.

The terminal that obtains the above results may determine weights based on a high rate of correspondence between the actual moving direction and a result obtained through each algorithm. For example, the terminal may define the weight as 0.3 for each of the first and second algorithms causing the highest rate of correspondence. Also, the terminal may define the weight as 0.25 for the third algorithm causing the next high rate of correspondence, and define the weight as 0.15 for the fourth algorithm causing the lowest rate of correspondence.

Although in the above description the terminal measures its moving directions through several algorithms while already knowing the terminal locations and the moving path, this is an example only. Alternatively, any other external device such as a server may perform the above operations instead of the terminal.

Figure 4:
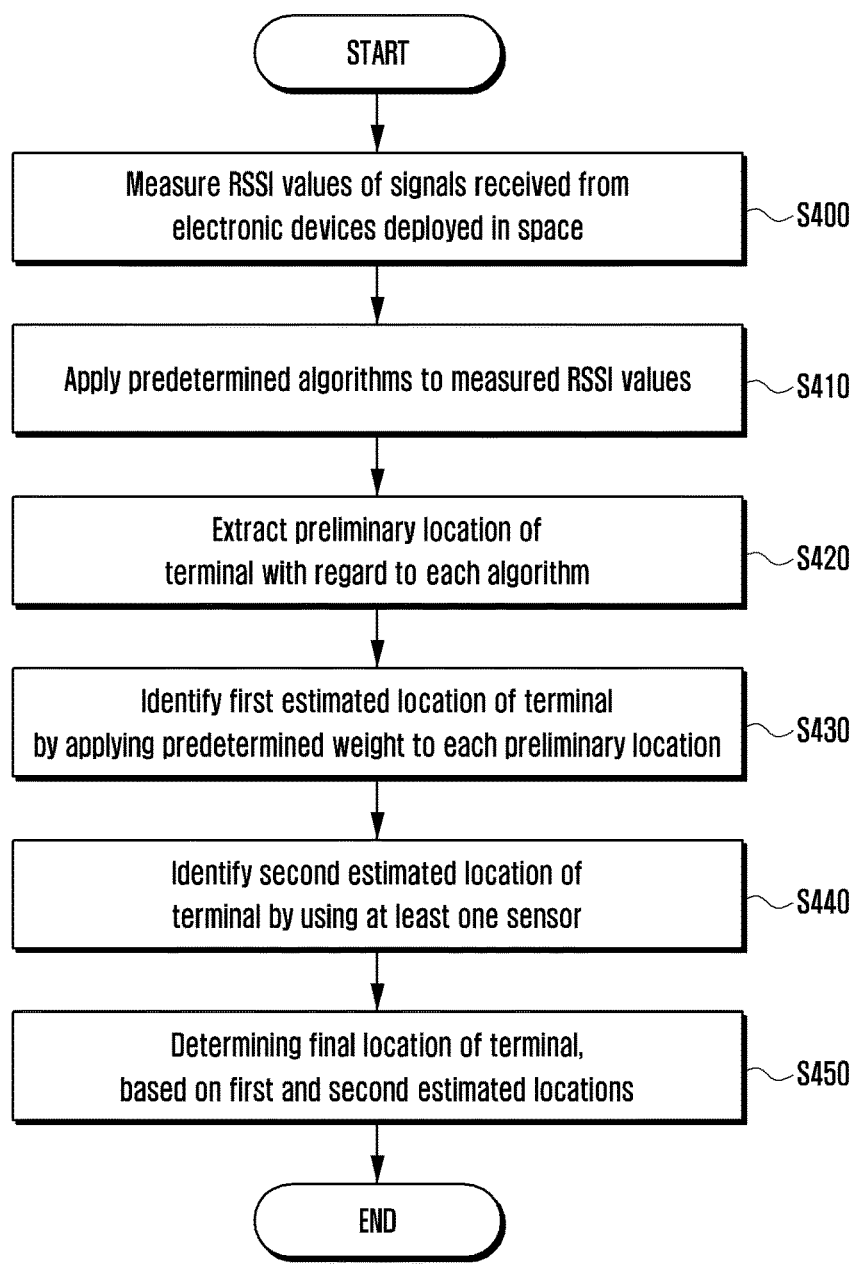
FIG. 4 is a flowchart illustrating an example method for measuring a terminal location according to an example embodiment.

FIG. 4 is a flowchart illustrating an example method of measuring a terminal location according to an example embodiment. A method for determining a final location of a terminal will be described with reference to FIG. 4.

At step S400, the terminal may measure a received signal strength indicator (RSSI) value of each signal received from each of a plurality of electronic devices which are deployed in a certain space.

For example, in order to measure a terminal location, the electronic devices deployed in the same space in which the terminal is present may be used. The electronic devices may be installed separately at regular intervals in the above space. The electronic devices may transmit or receive a signal to or from the terminal. Thus, the terminal may measure the strength of a signal received from each of the electronic devices and then measure a distance from each electronic device.

For example, each of the electronic devices may be a device, such as, for example, an access point (AP), which performs a relay function so as to extend a wired network to a wireless network in the above space.

Using the RSSI of a signal is merely an example, and any other indicator may be used alternatively or additionally to measure the strength of a signal between the terminal and each electronic device.

At step S410, the terminal may apply a plurality of predetermined algorithms to the measured RSSI values. At step S420, the terminal may extract or determine a preliminary location of the terminal with regard to each algorithm.

Assume, for convenience of description, that the terminal determines the location thereof using four algorithms. The terminal may extract the first preliminary location by applying the first algorithm to the measured RSSI values and also extract the second preliminary location by applying the second algorithm to the measured RSSI values. Similarly, the terminal may extract the third preliminary location by applying the third algorithm to the measured RSSI values and extract the fourth preliminary location by applying the fourth algorithm to the measured RSSI values.

The first algorithm determines a terminal location using, for example, the above-discussed Equations 1 and 2 about a path loss model and a distance determination between the terminal and each AP with regard to three or more APs. For example, the first algorithm may be based on or similar to triangulation.

The second algorithm may, for example, be a procedure for applying a weight to the first algorithm based on the RSSI. For example, the second algorithm may assign a higher reliability to an AP that transmits a higher-strength signal.

On the assumption that the terminal may be located at various places in a space, the third algorithm may use, for example, a result of estimating mathematically the RSSI between each place and each AP using the above-discussed Equations 1 and 2 about a path loss model and a distance determination between a certain place and each AP.

According to the third algorithm, the terminal may, for example, compare an estimated RSSI value of each place with the RSSI value measured from each AP. Then the terminal may regard, as a terminal location, a specific place at which, for example, the Euclidean error between the estimated RSSI value and the measured RSSI value is minimized.

The fourth algorithm determines each distance (d) using the above-discussed Equations 1 and 2 about a path loss model and a distance determination between the terminal and each of four or more APs, and then determines the terminal location from four or more equations about ratios of the determined distances.

The above-discussed first to fourth algorithms are only examples, and various algorithms for determining the RSSI and distance between the AP and the terminal may be used.

The terminal may identify a plurality of preliminary locations of the terminal through respective algorithms from the plurality of measured RSSI values.

At step S430, the terminal may identify the first estimated location by applying a predetermined weight to each preliminary location.

For example, the weight may be a predetermined value with regard to each of different algorithms. If there are four or more algorithms, there may also be four or more weights. Thus, the terminal may respectively apply the predetermined weights to the first to the fourth preliminary locations.

The weights may be determined before the terminal location is determined. A method for determining the weights is the same or similar to that discussed above.

At step S440, the terminal may identify the second estimated location of the terminal using at least one sensor. For example, the terminal may identify the second estimated location by using a pedestrian dead reckoning (PDR) technique or function.

For example, the terminal may include a plurality of sensors such as, for example, and without limitation, a geomagnetic sensor, a gyroscope sensor, and an acceleration sensor. Using such sensors, the terminal may determine a moving speed, a moving direction, a relative location from the previously measured location, or the like.

At step S450, the terminal may determine the final location thereof on the basis of the first and second estimated locations. For example, in the PDR function, errors in positioning by sensors may be accumulated. This may need compensation when the terminal grows apart from a starting place. Therefore, the final location of the terminal may be determined using the second estimated location determined by the PDR function together with the first estimated location.

Figure 5:
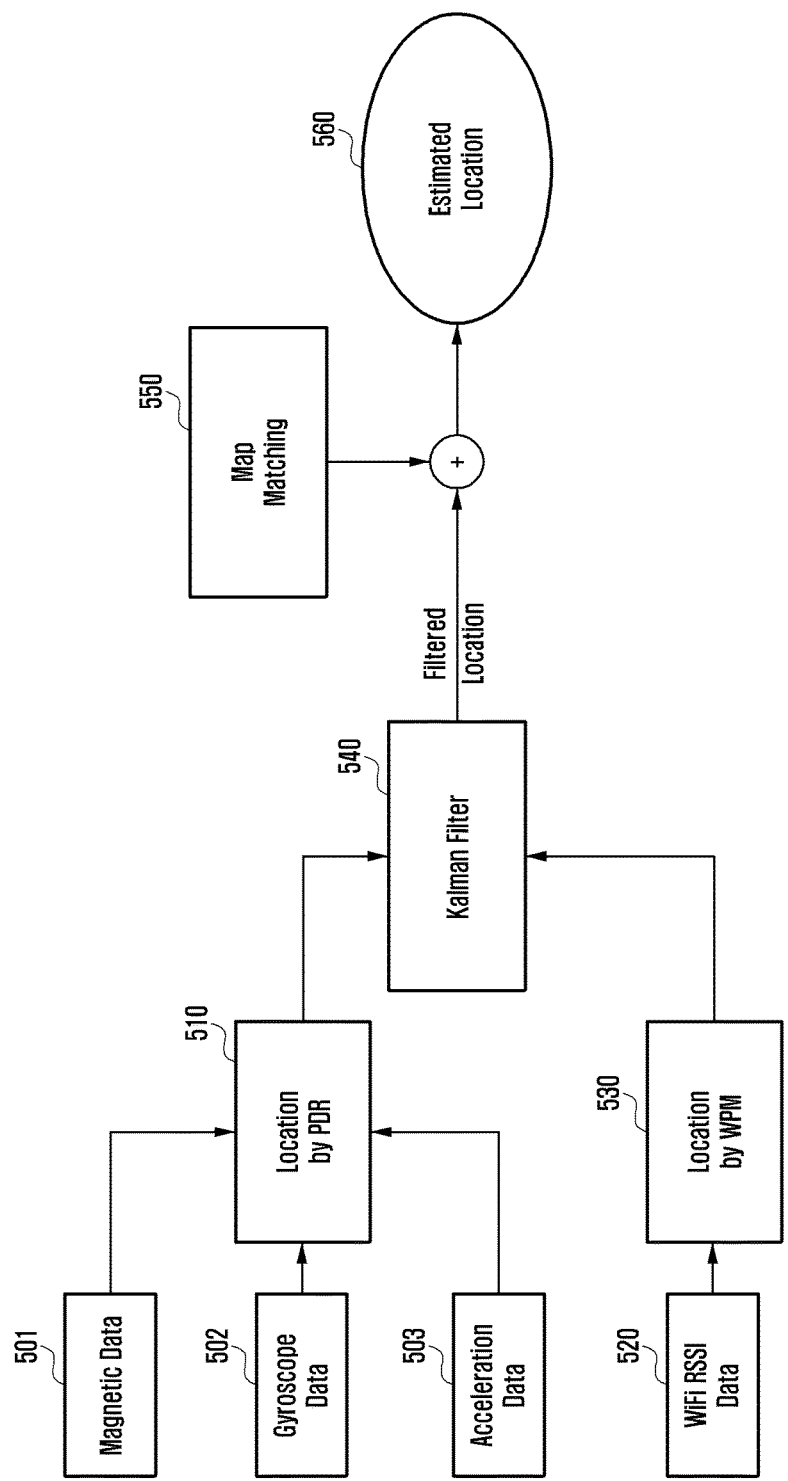
FIG. 5 is a block diagram illustrating example elements used for measuring a terminal location according to an example embodiment.

FIG. 5 is a block diagram illustrating example elements used for measuring a terminal location according to an example embodiment.

In FIG. 5, blocks 501, 502 and 503 indicate elements for collecting data by respectively using a magnetic sensor, a gyroscope sensor and an accelerator sensor which are equipped in the terminal. These sensors are examples only, and any other sensor of the terminal may be used for collecting data.

At a block 510, the terminal may determine an estimated location thereof by means of the PDR function using data collected by the magnetic sensor, the gyroscope sensor, and the accelerator sensor.

Figure 6:
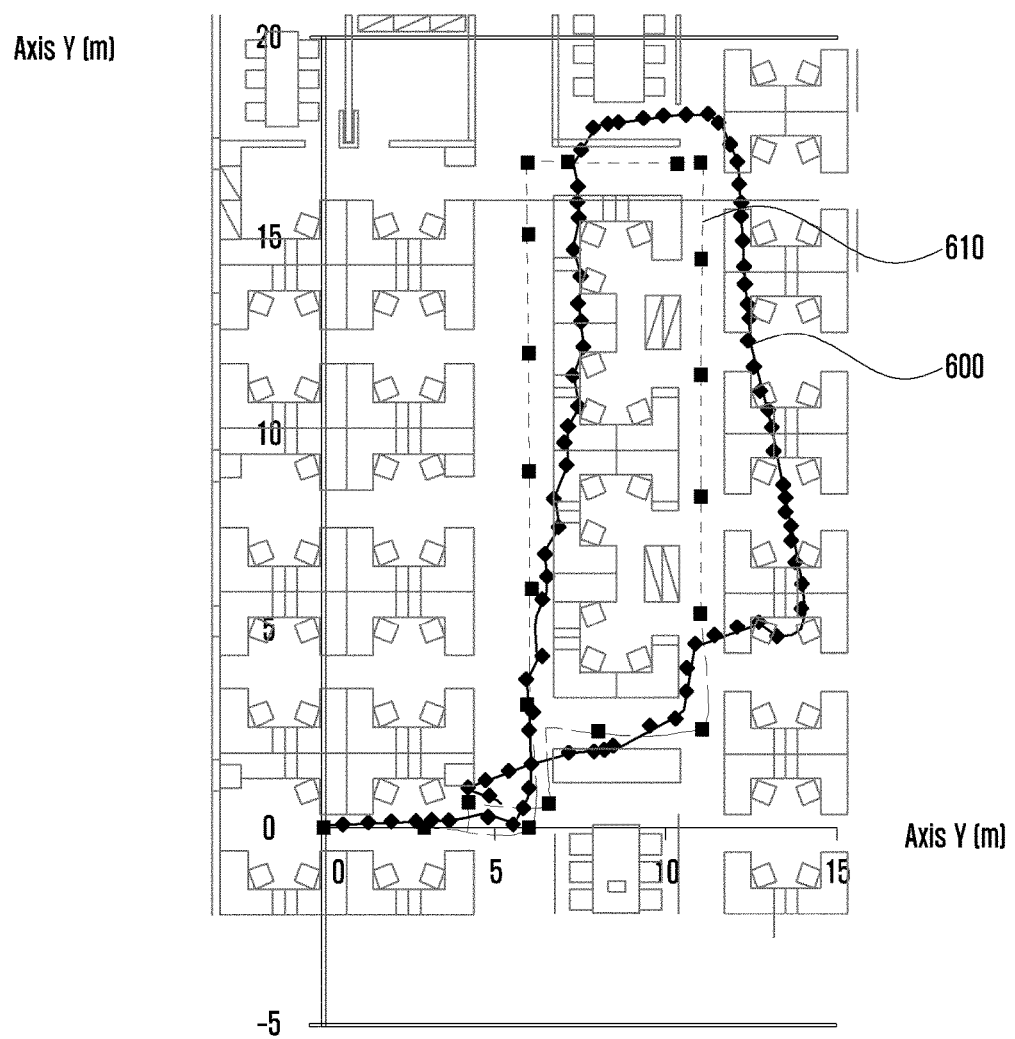
FIG. 6 is a diagram illustrating an example result of measuring a terminal location using a plurality of sensors of a terminal and then compensating the measured terminal location according to an example embodiment.

FIG. 6 is a diagram illustrating an example result of estimating a terminal location using the PDR function and the above-discussed method in an example embodiment. A reference numeral 600 indicates a result of collecting data through the sensors as discussed above and then estimating the terminal location by means of the PDR function.

As illustrated in FIG. 6, the above-discussed method can estimate more precisely the terminal location. However, as indicated by a reference numeral 610, the PDR function may accumulate errors in positioning by the sensors, so that compensation may be needed when the terminal grows apart from a starting place.

Returning to FIG. 5, at a block 520, the terminal may measure the strength of signals received from a plurality of electronic devices in a space where the terminal is present. As illustrated in FIG. 5, the terminal may measure the RSSI of Wi-Fi signals received from a plurality of APs installed previously in the space.

At block 530, the terminal may determine an estimated location thereof using the measured RSSI. As discussed above, the terminal may identify the estimated location by respectively applying a plurality of algorithms to the measured RSSI values and also applying predetermined weights corresponding to the algorithms to preliminary locations obtained through the algorithms.

This method for identifying the estimated location of the terminal may, for example, be referred to as a weighted propagation model (WPM) technique or function. At block 530, the estimated location of the terminal may be identified by the WPM function.

The estimated location of the terminal determined by the PDR function and the estimated location of the terminal determined by the WPM function may be mixed by, for example, a Kalman filter at block 540. Since the Kalman filter is well known, a related description will be omitted.

The use of the Kalman filter is merely an example, and any other filter such as a particle filter may be used.

A map matching block 550 may perform compensation for a terminal location determined through the Kalman filter. For example, using a terminal location filtered through the Kalman filter and a result of map matching, the terminal may determine a final location at a block 560.

Figure 7:
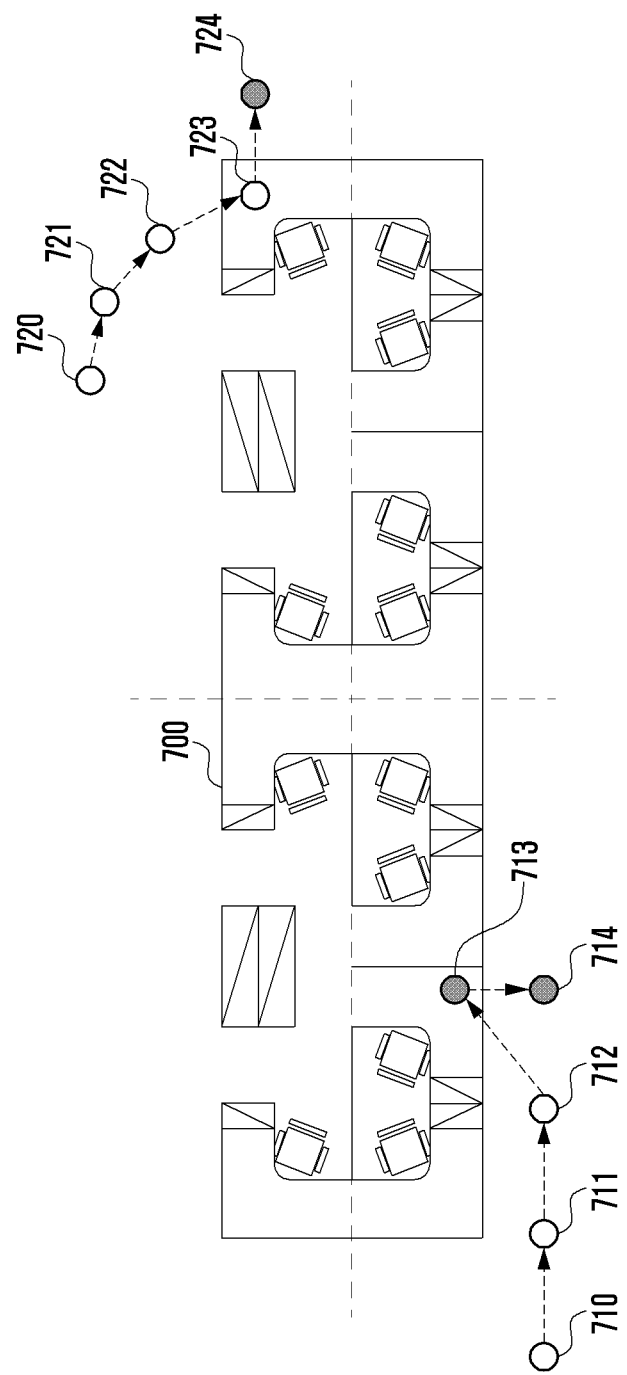
FIG. 7 is a diagram illustrating an example result of performing a map matching process according to an example embodiment.

For example, the map matching may be performed as illustrated in FIG. 7. For example, as seen from FIG. 7, the terminal may previously store a map 700 about a space where the terminal is present. This map 700 may contain, for example, information about walls, a floor, a furniture arrangement, locations of doors and windows, and the like in connection with the space. Based on the map 700, the terminal may store data about constraints disallowing a user of the terminal to walk. If the measured location of the user overlaps with the constraints, the terminal may compensate the measured user location to a location allowing the user to be present.

If the terminal locations are measured as indicated by reference numerals 710 to 713 in FIG. 7 for a certain time, the terminal may compare the measured locations 710 to 713 with the map 700. Based on the map 700, the terminal may determine that the location 713 corresponds to the location of furniture (e.g., a desk) in the space. Thus, the terminal may compensate the measured terminal location 713 to another location 714 on the basis of a moving direction from 710 to 712 and the map 700.

According to another example embodiment of the disclosure, if the terminal locations are measured as indicated by reference numerals 720 to 723 in FIG. 7 for a certain time, the terminal may compare the measured locations 720 to 723 with the map 700. Based on the map 700, the terminal may also determine that the location 723 corresponds to the location of furniture (e.g., a desk) in the space. Thus, the terminal may compensate the measured terminal location 723 to another location 724 on the basis of a moving direction from 720 to 722, an approach angle, and the map 700.

Hereinafter, a more detailed description for utilizing the user location measured by the above-discussed method will be described with reference to FIGS. 8 to 12. Since the aforementioned location measurement method uses both the PDR function and the WPM function, this method will be referred to as hybrid localization technique.

Figure 8A:
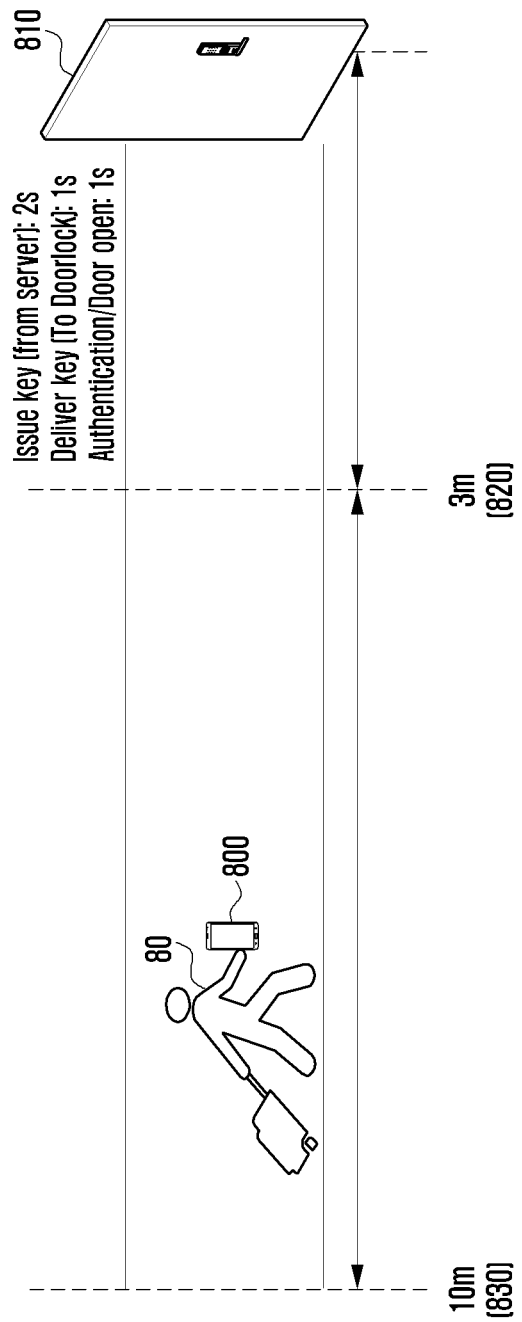
FIGS. 8A and 8B are diagrams illustrating an example of sensing a user terminal approaching a door lock according to an example embodiment.

FIG. 8A is a diagram illustrating a user 80 approaching a door lock 810 according to an example embodiment. Assume, for convenience of description, that the door lock 810 is equipped on a room door of a hotel and the user 80 opens the door lock 810 with a smart key using his or her smart phone 800.

For example, a check-in counter issues a smart key to the smart phone 800 of the user 80. When approaching the door lock 810 within a critical distance, the user 80 may receive, using the smart phone 810, a notification about the approach to the door lock 810.

Considering a user's walking speed, the issuance of the smart key should start before a user's arrival at, for example, a 3 m distance 820 from the door lock 810 such that the issuance and delivery of the smart key can be finished before a user's arrival at the door lock 810 and also the user 80 can be authorized and use an automatic door open service using the smart key. Thus, when the user 80 is located within the critical distance 830 (e.g., 10 m) from the door lock 810 and before arriving at the 3 m distance 820, a notification that the user 80 is approaching the door lock 810 may be transmitted to the smart phone 800.

For example, in case of measuring a user location by means of the hybrid localization technique, the accuracy of transmitting a notification about a user's approach to the door lock 810 to the smart phone 800 may be improved.

Figure 8B:
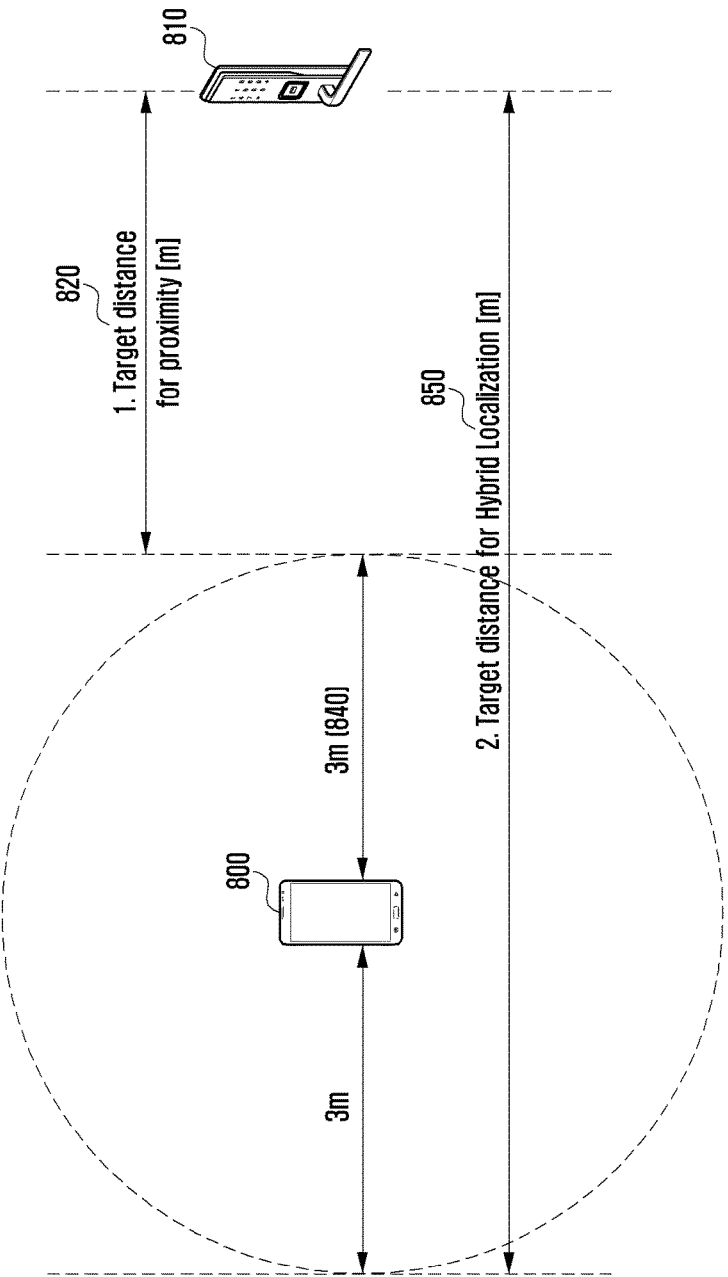

FIG. 8B is a diagram illustrating an example method for determining a target distance 850 that requires the measurement of a user location by means of the hybrid localization technique.

For example, a probability radius 840 in which the probability that the user terminal 800 will actually be present is more than 90% may be selected from the user location measured by the above-discussed method. For example, if the probability radius 840 is 3 m, the target distance 850 may be determined as 9 m by the sum of the aforementioned 3 m distance 820 determined considering a user's walking speed and the diameter 6 m of the probability radius 840.

Therefore, according to the hybrid localization technique, a notification about an approach to the door lock 810 may be displayed on the smart phone 800 when it is measured that the smart phone 800 is present at a distance of 9 m from the door lock 810.

Although the above notification may be displayed under the control of a processor in the smart phone 800, this is an example only. Alternatively, under the control of a control device or server of a hotel, the location of the smart phone 800 may be measured, and the notification may be transmitted to the smart phone 800 based on a result of the measurement.

Alternatively, the smart phone 800 may transmit a measured location to such a control device or server, and then the control device or server may transmit the notification to the smart phone 800.

Also, displaying the notification is an example only, and the notification may be output in another manner such as a vibration or light-flickering.

Figure 9A:
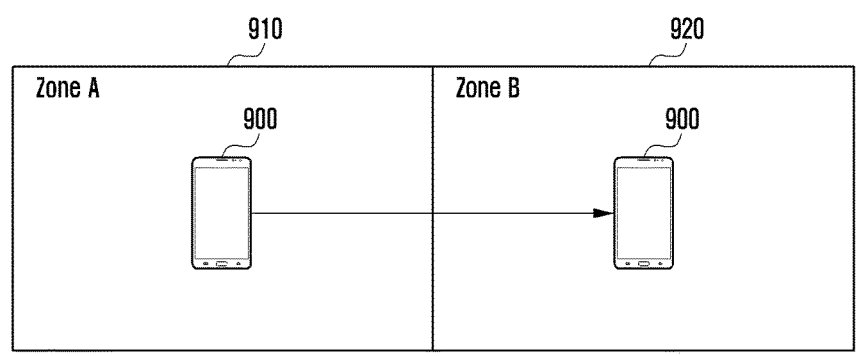
FIGS. 9A, 9B and 9C are diagrams illustrating an example method for controlling a PDR function depending on a measured user location according to an example embodiment.
Figure 9B:
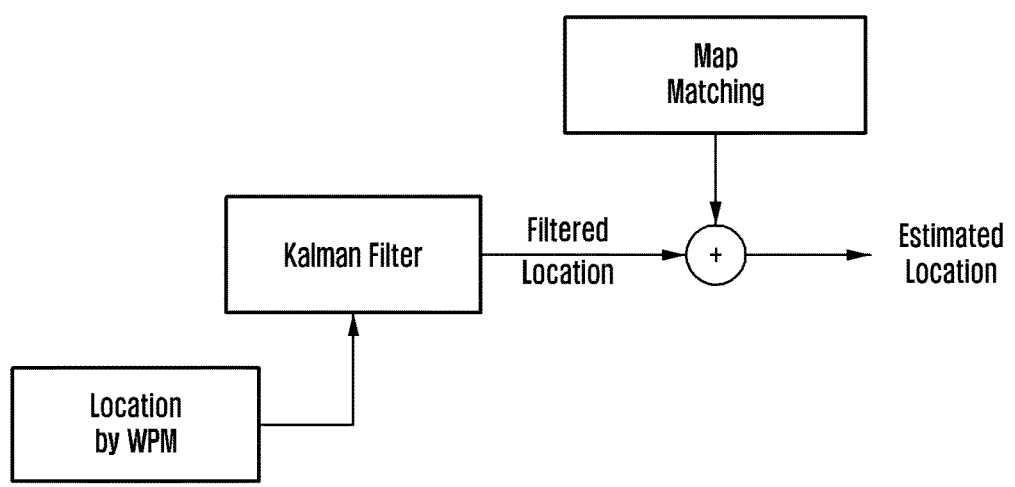
Figure 9C:
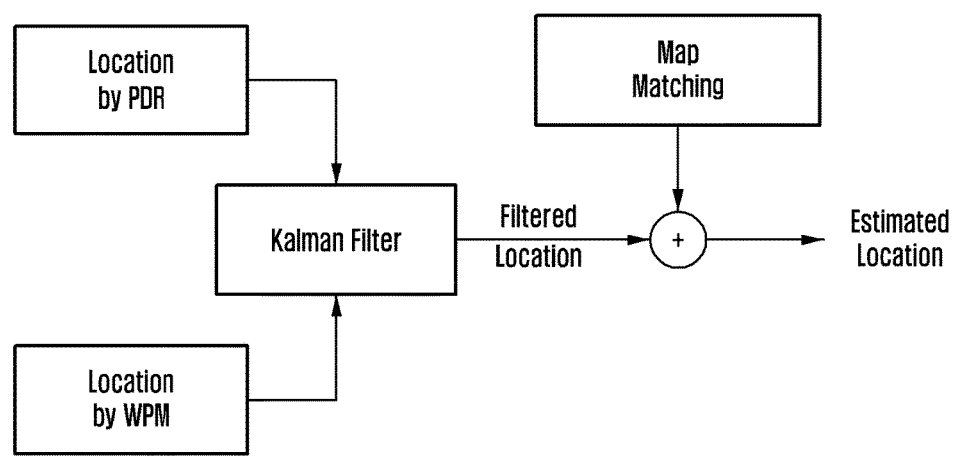

FIGS. 9A to 9C are diagrams illustrating an example method of controlling a PDR function depending on a measured user location according to an example embodiment.

For example, in order to reduce power consumption and save resources of a user terminal such as a smart phone, the PDR function to measure the terminal location may be activated or inactivated in the hybrid localization method.

For example, in case a precise movement of a user terminal 900 is not important in a certain space 910 such as a lecture room, a conference room, or a performing place, the terminal 900 may inactivate (e.g., turn off) the PDR function in the space 910 as illustrated in FIG. 9A. Thus, the terminal 900 may measure the location thereof by using only the WPM function as illustrated in FIG. 9B.

If it is determined that the terminal 900 exits the space 910 that requires no precise location measurement, namely if the terminal 900 enters another space 920 that requires a precise location measurement as illustrated in FIG. 9A, the terminal 900 may activate (e.g., turn on) the PDR function.

FIG. 9C schematically illustrates an example method for measuring a user location by means of the PDR function as well as the WPM function.

The above-discussed space 910 that requires no precise location measurement may be predetermined. For example, the aforementioned map stored in the terminal 900 may contain information about specific spaces that require no precise location measurement.

FIG. 10 is a diagram illustrating an example method of controlling a PDR function according to an example embodiment.

FIG. 10 illustrates by example and schematically a hotel having divided spaces for performing different functions. If a user carrying a terminal 1000 enters the hotel, air-conditioning and heating equipment of a user's room 1100 may be turned on.

In order to turn on the air-conditioning and heating equipment, the location of the terminal 1000 may be measured using the above-discussed hybrid localization technique.

While the terminal location is measured continuously, it may be determined that the user enters another space other than his or her room 1100. Then the air-conditioning and heating equipment of the user's room 1100 may be turned off.

For example, if it is measured that the user is located in a fitness room 1200 on the third floor, the air-conditioning and heating equipment of the user's room 1100 may be turned off. Also, the fitness room 1200 may be classified as a space that requires no precise location measurement. Thus, the PDR function of the terminal 1000 may be inactivated or turned off.

If it is measured or determined that the user leaves the fitness room 1200, the air-conditioning and heating equipment of the user's room 100 may be turned on again. Further, the PDR function of the terminal 1000 may be activated or turned on again so as to more precisely estimate the terminal location.

The above operations of controlling the air-conditioning and heating equipment of the user's room and controlling the PDR function may be performed by a control devices or server of the hotel. Alternatively, the terminal may perform the hybrid localization technique and send a result of location measurement to the control device or server of the hotel. The control device or server may control the air-conditioning and heating equipment depending on the received result.

Figure 11B:
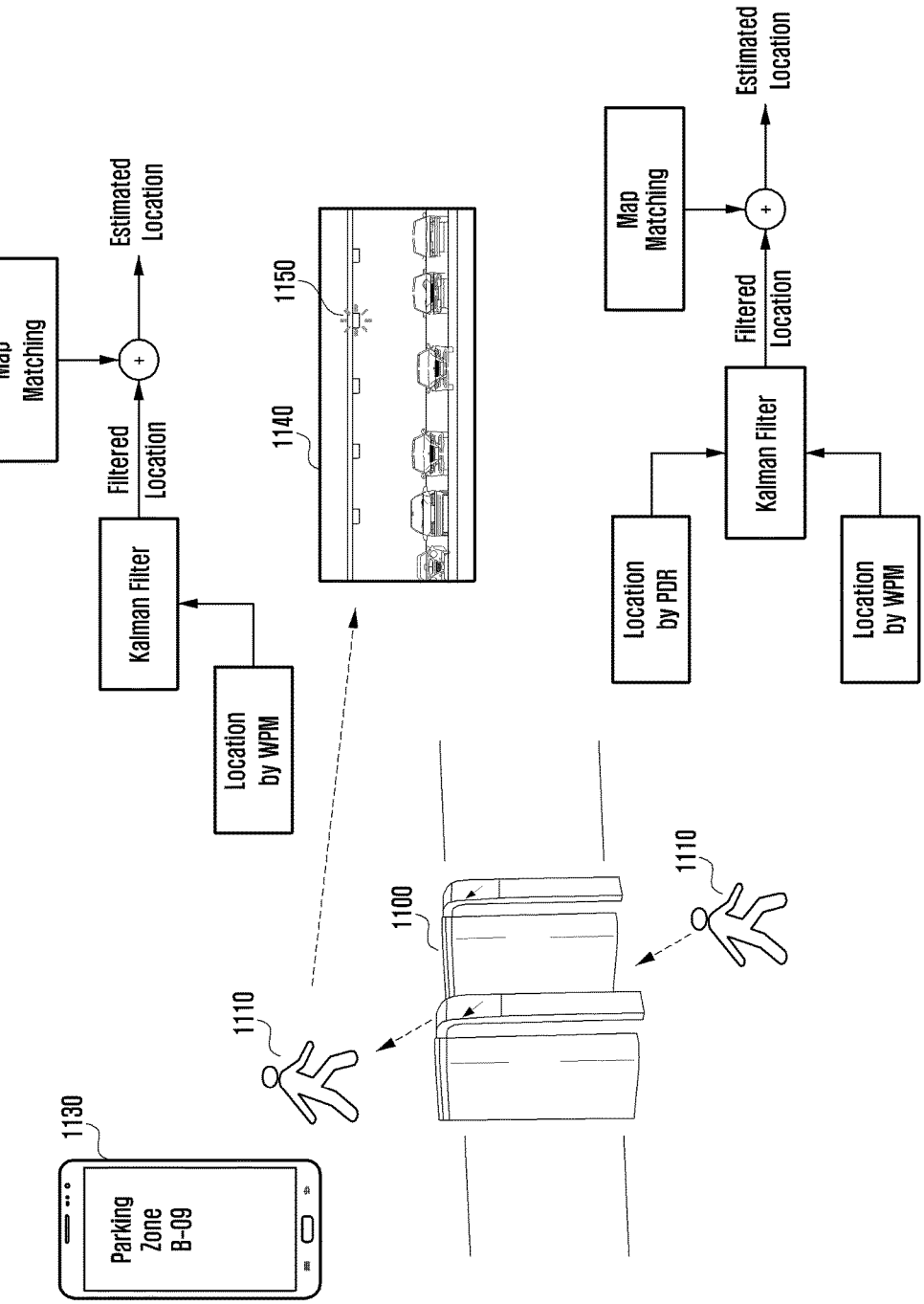

FIGS. 11A and 11B are diagrams illustrating an example method of controlling a PDR function depending on a user's entrance or exit according to an example embodiment.

As illustrated in FIG. 11A, if it is determined through the WPM technique or any other location tracking technique using a user terminal that a user 1110 passes through a doorway 1100, the PDR function of the user terminal may be activated or turned on.

For example, when the user 1110 passes through the doorway 1100 of a certain building, e.g., an enterprise which emphasizes a security issue or a shopping mall which offers information depending on a user location, the PDR function of the terminal may be activated or turned on so as to more precisely measure or determine the user location.

Also, if the user 1110 is authorized by means of card tagging, fingerprint recognition, iris recognition, or the like at the doorway 1100 in a state where the hybrid localization technique of the terminal is inactivated, the hybrid localization may be activated.

FIG. 11B illustrates, for example, a user's exit from a building through the doorway 1100. In this example, the PDR function of the terminal may be inactivated or turned off so as to reduce power consumption and save resources.

Then parking information may be displayed on a user's terminal 1130. If it is determined as a result of measuring the user location that the user 1110 arrives at a parking lot 1140, any information suitable for identifying a user's car may be outputted according to the parking information. For example, as illustrated, a light 1150 disposed over the user's car may flicker.

The above operation may be performed by a control device or server of the building. For example, using the hybrid localization technique, the terminal 1130 may recognize that the user 1110 goes outside the building through the doorway 1100. Then the terminal 1130 may transmit recognized information to the control device or server. Also, the terminal 1130 may turn off the PDR function and display the parking information.

Based on received information, the control device or server may control the parking lot 1140 to output information for identifying the user's car.

Figure 12:
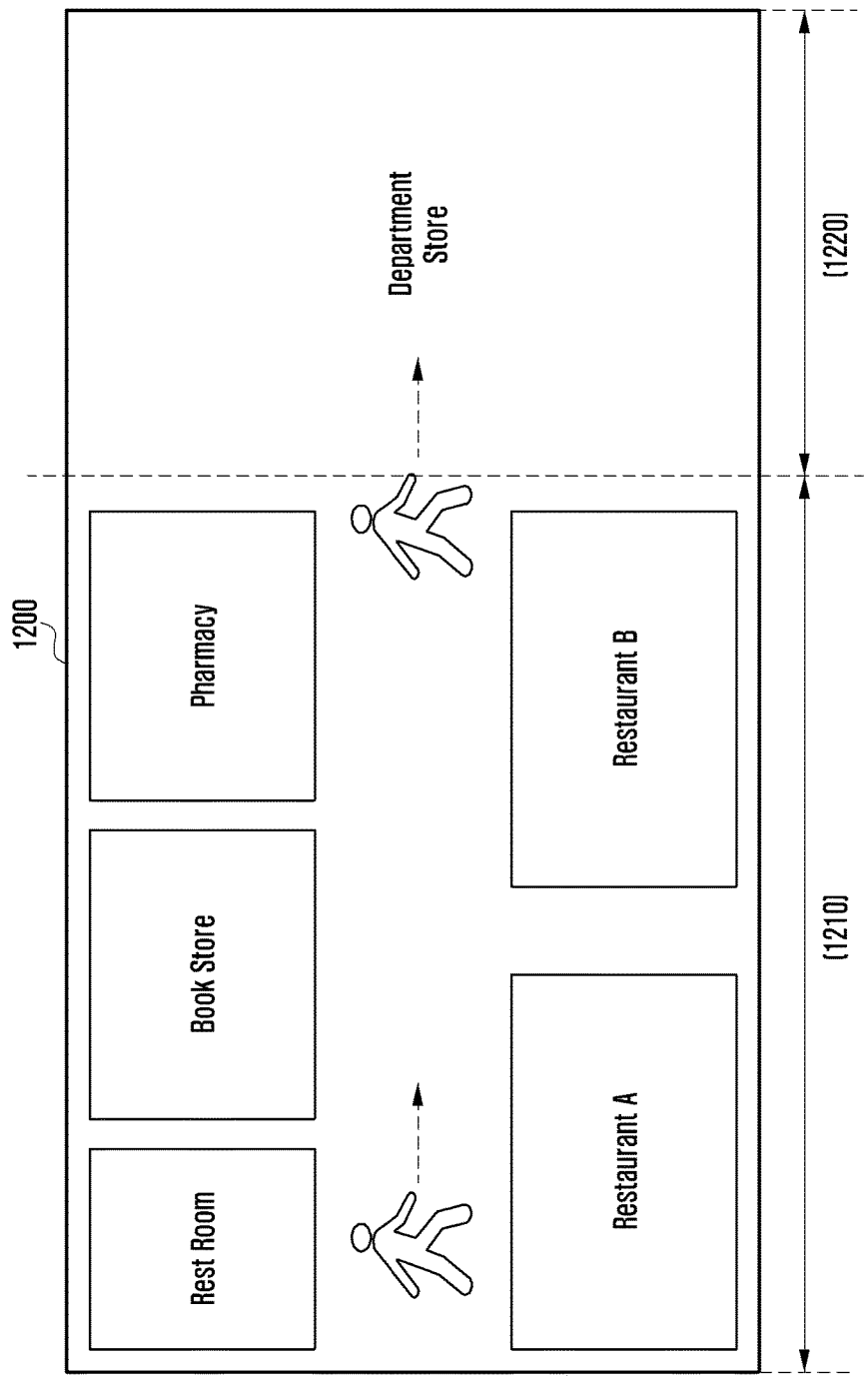
FIG. 12 is a diagram illustrating an example method for controlling a PDR function depending on a user's entrance or exit to or from a predetermined space according to an example embodiment.

FIG. 12 is a diagram illustrating an example method for controlling a PDR function depending on a user's entrance or exit to or from a predetermined space according to an example embodiment.

For example, when a user is located inside a building 1200, the inner area of the building 1200 may be divided into some sections for performing different functions.

For example, if there is a department store 1220 in the building 1200, a user location in any section 1210 other than the department store 1220 may be estimated by measuring RSSI. On the other hand, if the user is located in the department store 1220, the PDR function may be activated for a more precise estimation of the user location.

Therefore, the location of the user located in the department store 1220 may be estimated more precisely. Data or information about user locations in the department store 1220 may be used for a prevention of thefts, a survey of consumer preferences about stores or articles, and the like.

The above-discussed location estimation may be performed by the user terminal or alternatively by the control device or server for controlling the building 1200.

If it is determined as a result of estimating the user location that the user is approaching a certain store in the building 1200, an online coupon or the like issued by that store may be displayed in a popup form on the user terminal.

Figure 13:
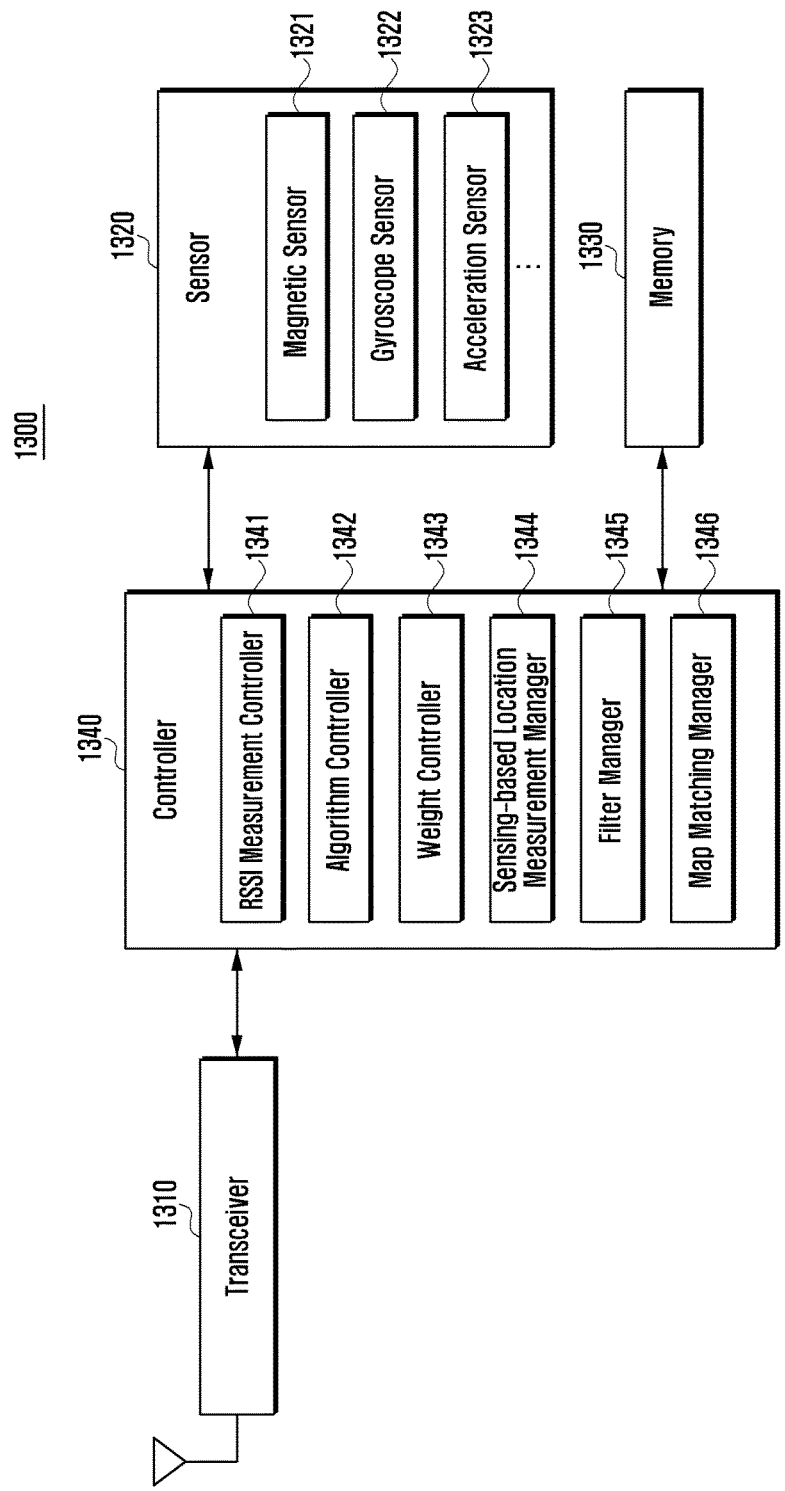
FIG. 13 is a block diagram illustrating elements of an example terminal according to an example embodiment.

FIG. 13 is a block diagram illustrating elements of an example terminal according to an example embodiment.

As illustrated in FIG. 13, the terminal 1300 may include a transceiver 1310, a sensor 1320, a memory 330, and a controller 1340.

The transceiver 1310 is an element including communication circuitry configured to perform communication with an external electronic device. For example, the transceiver 1310 may receive a signal from an electronic device, such as an AP, deployed in a building or transmit a signal to the electronic device.

The sensor 1320 is an element configured to sense various kinds of data. For example, the sensor 1320 may include various types of sensors such as a magnetic sensor 1321, a gyroscope sensor 1322, and an acceleration sensor 1323. These sensor types are, however, examples only and not to be construed as a limitation of sensors in the sensor 1320.

The magnetic sensor 1321 may detect a magnetic signal around the terminal 1300. For example, the magnetic sensor 1321 may measure the strength and/or direction of a magnetic field or a line of magnetic force.

The gyroscope sensor 1322 may detect an angular velocity, namely, a rotation speed.

The acceleration sensor 1323 may measure the acceleration of an object or the strength of shock.

Using the above sensors or the like, the sensor 1320 may sense various kinds of data for determining the movement, location, or the like of the terminal 1300.

The memory 1330 is an element configured to store various kinds of information and data. For example, the memory 1330 may store a result of measuring a terminal location. Also, the memory 1330 may store predetermined information, e.g., weights and algorithms, for measuring the terminal location.

The controller 1340 is an element (e.g., including processing circuitry) configured to control the terminal 1300. The controller 1340 may include some elements such as an RSSI measurement controller 1341, an algorithm controller 1342, a weight controller 1343, a sensing-based location measurement manager 1344, a filter manager 1345, and a map matching manager 1346. These elements of the controller 1340 may be implemented as hardware modules including various circuitry well understood by those skilled in the art, software modules, applications, or programs.

The RSSI measurement controller 1341 may measure the RSSI of a signal received, through the transceiver 1310, from each of the electronic devices located in the same space as the terminal 1300 exists.

The algorithm controller 1342 may extract preliminary locations of the terminal 1300 with regard to a plurality of algorithms by applying such algorithms to a plurality of measured RSSI values.

These algorithms may be designed to obtain location information of the terminal on the basis of distance information obtained from the RSSI value. For example, the first algorithm determines a terminal location using the above-discussed Equations 1 and 2 about a path loss model and a distance determination between the terminal and each AP with regard to three or more APs. For example, the first algorithm may be based on or similar to triangulation.

The second algorithm may, for example, be a procedure for applying a weight to the first algorithm based on the RSSI. For example, the second algorithm may assign a higher reliability to an AP that transmits a higher-strength signal.

Assuming, for convenience of description, that the terminal may be located at some places in a space, the third algorithm uses a result of estimating mathematically the RSSI between each place and each AP by using the above-discussed Equations 1 and 2 about a path loss model and a distance determination between a certain place and each AP.

According to the third algorithm, the terminal may compare an estimated RSSI value of each place with the RSSI value measured from each AP. Then the terminal may regard, as a terminal location, a specific place at which, for example, the Euclidean error between the estimated RSSI value and the measured RSSI value is minimized.

The fourth algorithm determines each distance (d) by using the above-discussed Equations 1 and 2 about a path loss model and a distance determination between the terminal and each of four or more APs, and then determines the terminal location from four or more equations about ratios of the determined distances.

Meanwhile, the above-discussed first to fourth algorithms are simply examples, and various algorithms for determining the RSSI and distance between the AP and the terminal may be used.

The weight controller 1343 may identify the first estimated location by applying predetermined weights to the respective preliminary locations. The weights may be determined based on error rates. By receiving signals from the APs at predetermined time intervals, measuring the RSSI values, and applying the above algorithms to the measured RSSI values, the error rates caused by output values of the applied algorithms and actual values of the terminal location may be identified. Also, the weights may be determined in response to a user input or depending on a variation of wireless environments.

The sensing-based location measurement manager 1344 may identify the second estimated location of the terminal using at least one sensor. For example, the sensing-based location measurement manager 1344 may receive sensing results from the sensors in the sensor 1320 and then identify the second estimated location.

The controller 1340 may determine a final location of the terminal, based on the first and second estimated locations.

For example, using a certain filter of the filter manager 1345, the controller 1340 may determine the final location of the terminal by combining the first estimated location identified at the weight controller 1343 with the second estimated location identified at the sensing-based location measurement manager 1344. The filter may, for example, and without limitation, be a Kalman filter, a particle filter, or the like.

Also, using the map matching manager 1346, the controller 1340 may perform a path compensation process with regard to the identified location of the terminal.

For example, under the control of the controller 1340, the memory 1330 may store a map of the space. If the identified location of the terminal is overlapped with any object in the space or placed out of the space, the map matching manager 1346 may compensate the path of the terminal on the basis of the stored map such that the terminal location is not overlapped with the object and is not placed out of the space.

As described hereinbefore, the terminal 1300 may measure more precisely the location of a user who carries the terminal 1300.

A program code for performing the above-described methods may be recorded in a non-transitory computer-readable storage medium to allow reading by a machine. The non-transitory computer-readable storage medium may include, for example, a CD, a DVD, a hard disk, a blue-ray disk, a USB, a memory card, a ROM, and the like.

While the present disclosure has been illustratred and described with reference to various example embodiments thereof, it will be understood by those skilled in the art that various changes in form and details may be made therein without departing from the scope of the disclosure as defined by the appended claims.

What is claimed is:

1. A method for measuring a location of a terminal, the method comprising:
performing a first location estimating operation including:
measuring received signal strength indicator (RSSI) values of signals received from a plurality of electronic devices located in a space;
extracting a plurality of preliminary locations of the terminal corresponding to a plurality of algorithms, respectively, by applying the plurality of algorithms to the measured RSSI values;
determining a first location of the terminal by applying a plurality of predetermined weights corresponding to the plurality of algorithms to the plurality of preliminary locations corresponding to the plurality of algorithms; and
determining whether to perform a second location estimating operation of the terminal, based on the first location;
determining a final location of the terminal based on the first location, if it is determined not to perform the second location estimating operation; and
determining the final location of the terminal based on the first location and the second location, if it is determined to perform the second location estimating operation,
wherein the second location is determined based on an output of at least one sensor.

2. The method of claim 1, wherein the plurality of algorithms is configured to obtain location information of the terminal, based on distance information obtained from the RSSI values.

3. The method of claim 1, wherein the plurality of algorithms includes:
a first algorithm configured to determine a terminal location using a model indicating a path loss and distance between the terminal and each electronic device with respect to three or more electronic devices;
a second algorithm configured to apply a predetermined weight of the plurality of predetermined weights to the first algorithm based on the measured RSSI value;
a third algorithm configured to estimate the RSSI value between each electronic device and an arbitrary point in the space using a model indicating a path loss and distance between each electronic device and the arbitrary point and a place at which a Euclidean error between the estimated RSSI value and the RSSI value measured at each electronic device is minimized as a terminal location; and
a fourth algorithm configured to determine each distance using a model indicating a path loss and distance between the terminal and each of four or more electronic devices and to determine a terminal location from four or more equations including ratios of the determined distances.

4. The method of claim 1, wherein the plurality of predetermined weights are determined based on error rates of received signals from the electronic devices at predetermined time intervals, measuring the RSSI values, applying the algorithms to the measured RSSI values, and identifying the error rates caused by output values of the applied algorithms and actual values of the terminal location.

5. The method of claim 1, wherein the determining of the final location of the terminal based on the first and second estimated locations includes combining the first and second estimated locations using a filter.

6. The method of claim 5, wherein the filter is at least one of a Kalman filter and a particle filter.

7. The method of claim 1, wherein the determining of the final location of the terminal further includes performing path compensation.

8. The method of claim 7, wherein the path compensation includes storing a map of the space and, if a location of the terminal overlaps with an object existing in the space or is placed out of the space, compensating a path of the terminal based on the stored map.

9. The method of claim 1, wherein the plurality of predetermined weights are determined in response to an input or in dependence on a variation of wireless environments.

10. A terminal comprising:
a transceiver; and
a controller configured to:
perform a first location estimating operation including measuring received signal strength indicator (RSSI) values of signals received through the transceiver from a plurality of electronic devices located in a space; extracting a plurality of preliminary locations of the terminal corresponding to each of a plurality of algorithms, respectively, by applying the plurality of algorithms to the measured RSSI values; determining a first location of the terminal by applying a plurality of predetermined weights corresponding to the plurality of algorithms to the plurality of preliminary locations corresponding to the plurality of algorithms;
determining whether to perform a second location estimating operation of the terminal, based on the first location;
determining a final location of the terminal based on the first location, if it is determined not to perform the second location estimating operation; and
determining the final location of the terminal based on the first location and the second location, if it is determined to perform the second location estimating operation,
wherein the second location of the terminal is determined based on an output of at least one sensor.

11. The terminal of claim 10, wherein the plurality of algorithms is configured to determine location information of the terminal, based on distance information obtained from the RSSI values.

12. The terminal of claim 10, wherein the plurality of algorithms includes:
a first algorithm configured to determine a terminal location using a model indicating a path loss and distance between the terminal and each electronic device with respect to three or more electronic devices;
a second algorithm configured to apply a predetermined weight of the plurality of predetermined weights to the first algorithm based on the measured RSSI value;
a third algorithm configured to estimate the RSSI value between each electronic device and an arbitrary point in the space using a model indicating a path loss and distance between each electronic device and the arbitrary point and a place at which a Euclidean error between the estimated RSSI value and the RSSI value measured at each electronic device is minimized as a terminal location; and
a fourth algorithm configured to determine each distance using a model indicating a path loss and distance between the terminal and each of four or more electronic devices and to determine a terminal location from four or more equations including ratios of the determined distances.

13. The terminal of claim 10, wherein the plurality of predetermined weights are determined based on error rates of received signals from the electronic devices at predetermined time intervals, measuring the RSSI values, applying the algorithms to the measured RSSI values, and identifying the error rates caused by output values of the applied algorithms and actual values of the terminal location.

14. The terminal of claim 10, wherein the controller is further configured to determine the final location of the terminal based on the first and second estimated locations by combining the first and second estimated locations using a filter.

15. The terminal of claim 14, wherein the filter is at least one of a Kalman filter and a particle filter.

16. The terminal of claim 10, wherein the controller is further configured to determine the final location of the terminal by performing path compensation.

17. The terminal of claim 16, further comprising:
a memory,
wherein the controller is further configured to store a map of the space in the memory and, if a location of the terminal overlaps with an object existing in the space or is placed out of the space, to compensate a path of the terminal based on the stored map.

18. The terminal of claim 10, wherein the plurality of predetermined weights are determined in response to an input or in dependence a variation of wireless environments.

* * * * *